United States Patent Office 3,340,083
Patented Sept. 5, 1967

3,340,083
GLASS MAT FIBERS BONDED TOGETHER BY A POLYESTER COMPOSITION
Paul Robitschek, Wilson, N.Y., assignor to Owens-Corning Fiberglas Corporation, a corporation of Delaware
No Drawing. Filed May 6, 1963, Ser. No. 278,461
14 Claims. (Cl. 117—21)

This invention relates to a polyester composition, and, more particularly, to a terephthalate or isophthalate neopentyl glycol polyester which is particularly suited for use as a binder for glass fiber mats of the type which are employed in making certain fiber reinforced plastics.

Mats for use in producing fiber reinforced plastics are known, and can be produced in any of various ways. It is important, however, that the glass fibers[1] therein be bonded to one another at points of contact, and by a relatively flexible binder, so that such a mat can be handled and fitted to the contours of a mold in which a fiber reinforced plastic is to be produced, and without substantial disruption of the mat. Accordingly, a mat binder must be capable of adhering glass fibers to one another, and must be sufficiently flexible that the mat can be handled and shaped as required prior to the time that a reinforced plastic is produced therefrom.

After a glass fiber mat has been packed into a suitable mold, a suitable, curable resinous composition is then associated therewith in the mold, and the molding operation, which may involve heat and pressure, is carried out. The molding operation may be matched die compression molding, hand lay-up molding, vacuum bag molding, or another process known to those skilled in the art. To be suitable for use in this part of the operation, the mat binder must be compatible with the resinous composition, and, preferably, be copolymerizable therewith. In addition, the ideal mat binder is one which does not itself discolor or cause discoloration of the cured resinous composition either during processing or under service conditions. It will be apparent, therefore, that a mat binder must meet an exacting series of qualifications to be suited for use.

The present invention is based upon the discovery of particular polyester compositions which have a particular combination of properties that suit them admirably for use as binders in a glass fiber mat. The polyester compositions according to the invention are made by esterification of neopentyl glycol or equivalent, isophthalic acid or terephthalic acid, or mixtures thereof, and a flexibilizer, and preferably also includes an ethylenically unsaturated alpha, beta-dicarboxylic acid. The flexibilizer can be one of certain glycols, one of certain dicarboxylic acids, or a combination of the two.

It is, therefore, an object of the invention to provide an improved polyester composition.

It is a further object of the invention to provide an improved polyester of neopentyl glycol or equivalent, isophthalic acid or terephthalic acid or mixtures thereof and a flexibilizer.

It is a further object of the invention to provide a glass fiber mat wherein glass fibers are bonded to one another at points of contact by an improved polyester.

Other objects and advantages will be apparent from the description which follows, which is intended only to illustrate and disclose, and in no way to limit, the invention.

An improved polyester is provided according to the invention. Such polyester is one wherein the glycol consists essentially of from 75 percent[2] to 100 percent of one having the generic formula

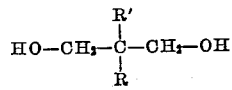

the acid is dicarboxylic, and consists essentially of from 25 percent to 100 percent of isophthalic acid, terephthalic acid or mixtures thereof, and from about 1 percent to about 25 percent of at least one flexibilizer. R and R' in the foregoing generic formula are alkyl groups having from 1 to 4 carbon atoms. The flexibilizer can be any one of certain glycols having from 3 to 8 carbon atoms, a polyglycol having from 4 to 18 carbon atoms, a dicarboxylic acid having from 4 to 10 carbon atoms and the generic formula $(CH_2)_n(COOH)_2$, or mixtures thereof, and, in any event, is an integral part of the polyester. In a preferred embodiment, the polyester also includes, as an integral part thereof, from 10 percent to 50 percent of an ethylenically unsaturated alpha, beta-dicarboxylic acid for copolymerization with the curable, resinous composition, most desirably an unsaturated polyester, which is used in producing the final fiber reinforced plastic.

As has been indicated above, a flexibilizer is an essential, integral constituent of a polyester according to the invention, and can be of any of certain glycols having from 3 to 8 carbon atoms, a polyglycol having from 4 to 18 carbon atoms, a dicarboxylic acid having from 4 to 10 carbon atoms and the generic formula $(CH_2)_n(COOH)_2$, or mixtures thereof. When the flexibilizer is a glycol having from 3 to 8 carbon atoms, the two carbon atoms to which the hydroxy groups are attached must be linked to one another by a hydrocarbon chain which includes a methylene group, and there must be a total of at least 3 hydrogens attached to the two carbon atoms to which the hydroxy groups are attached. This means that the glycol must be one in which at least one of the carbons to which a hydroxyl group is attached is primary, not more than one is secondary, and neither is tertiary. In addition, it means that the two carbon atoms which are attached to hydroxyl groups must be separated by a hydrocarbon chain which includes at least one methylene group. The simplest glycol of this type is 1,3-propane diol, but the 3- carbon can be substituted by an alkyl group having not more than five carbon atoms. Also, the glycol can be 1,4-, 1,5-, 1,6-, 1,7- or 1,8-, and, in such event, the hydrocarbon chain linking the two carbon atoms which are attached to the hydroxyl groups can be substituted with one or more alkyl groups, so long as the glycol itself does not include more than eight carbon atoms, and so long as the hydrocarbon chain linking the two carbons includes at least one methylene group.

When the flexibilizer is a polyglycol, the flexibilizing function is performed by the ether linkage or linkages thereof, and it is not necessary that there be a methylene group linking the carbon atoms to which the hydroxyl groups are attached. Even in this case, however, it is preferred that the carbons which are attached to the hydroxyl groups be either primary or secondary.

It is essential that a glycol-dicarboxylic acid polyester according to the invention be one in which the glycol or glycols and the dicarboxylic acid or acids are present in substantially equimolecular proportions. A small excess of either the glycol or the dicarboxylic acid portion thereof can be charged, for example up to about 10 percent, but, preferably, neither the glycol nor the dicarboxylic acid portion of the polyester is used in an excess of more than about 5 percent. Most desirably, any excess is of the glycol.

---

[1] The term "glass fibers" as used herein and in the appended claims refers either to individual glass filaments or to glass strands, which are bundles of filaments in parallel arrangement.

[2] The term "percent," as used herein, and in the appended claims, refers to mol percent, unless otherwise indicated.

It is also important that a polyester according to the invention be condensed to a molecular weight[3] which is within the range of from about 3000 to about 5000. Such a molecular weight is intermediate between that of the usual unsaturated polyesters, i.e., those which include a desired amount of an ethylenically unsaturated alpha, beta-dicarboxylic acid, but is lower than the usual molecular weight of polyesters that are used in producing textile fibers.

Finally, it is essential that a polyester according to the invention have a softening point[4] of at least 80° C. and below 200° C. After the polyester has been produced, by esterification of a desired glycol or glycol composition with a desired dicarboxylic acid or dicarboxylic acid composition, the polyester is preferably granulated to a particle size such that it can be dusted onto a previously formed glass fiber mat, and will thereupon penetrate into the mat. Upon heating of the mat with the polyester according to the invention distributed therethrough, the polyester softens and thereby bonds fibers in the mat to one another at points of contact. It has been found in practice that a polyester according to the invention having a molecular weight not higher than about 5000 can be heated to a temperature sufficiently high to effect such bonding without causing deterioration, and that the polyester, if its softening point is at least 80° C., is satisfactory for subsequent processing.

As has been indicated above, the polyester according to the invention preferably includes from 10 percent to 50 percent of an ethylenically unsaturated alpha, beta-dicarboxylic acid. It will be appreciated that a polyester including such an acid is capable of copolymerization with an unsaturated polyester to be reinforced by the mat. For such copolymerization to occur, the polyester according to the invention must be in a reactive condition at the time that cure of the resinous material to be reinforced occurs. Ordinarily, to be reactive, the polyester according to the invention must be liquefied to be in a reactive condition. Liquefication can occur as a consequence of heating, as an incident of the curing of the resinous material to be reinforced, or as a consequence of the solvent action of styrene, diallyl phthalate, or other suitable copolymerizable monomer present therewith. The liquefication may also be a consequence of a combination of thermal and solvent phenomena. Accordingly, a relatively low softening point favors copolymerization of the binder resin according to the invention with the curable plastic material to be reinforced. Under most conditions, therefore, it is preferred that the polyester according to the invention have a softening point below 200° C. and preferably not higher than about 125° C. When the polyester according to the invention includes an ethylenically unsaturated alpha, beta-dicarboxylic acid, such a comparatively low softening point facilitates copolymerization between the binder resin and the plastic material to be reinforced. When the polyester according to the invention does not include an ethylenically unsaturated, alpha, beta-dicarboxylic acid, such a comparatively low softening point facilitates solution between the plastic material to be reinforced and the polyester binder resin according to the invention and consequent homogeneity in the ultimate product.

The following examples are presented solely for the purpose of further illustrating and disclosing the invention, and are in no way to be construed as limitations thereon.

EXAMPLE 1

The following example describes the preparation of the best presently known polyester according to the invention:

A stainless steel reaction vessel equipped with a nitrogen inlet near the bottom thereof, a mechanical stirring blade, and an overhead packed column for rectification of distillate, was charged with 132.6 pounds of neopentyl glycol and 26.5 pounds of diethylene glycol. This charge was then heated to a temperature of about 180° F. by circulating a heating fluid through a jacket which surrounded the vessel and, when a temperature of 180° F. was indicated for the charge, agitation was commenced, and was continued throughout the remainder of the cook. Agitation caused an apparent temperature drop to about 115° F., but heating was continued and, when a temperature indication of 150° F. was noted, a 49 pound charge of maleic anhydride and a 17 gram portion of toluhydroquinone were added to the reactor. The temperature was then gradually increased over a period of about one-half hour to 250° F., and a 166 pound charge of isophthalic acid was added thereto. The reaction temperature was increased to and held at 420° F. until a solution of 40 parts by weight of the polyester in 60 parts by weight of Cellosolve acetate had a Gardner viscosity of about P. This reaction required approximately 35 hours. From the time the glycol was charged until after the completion of the reaction nitrogen was bubbled slowly through the reaction mixture to provide a protective atmosphere and, particularly during the later stages of the reaction, to facilitate removal of water of esterification. Two additional charges of 17 grams each of toluhydroquinone were added to the reaction mixture, one approximately 12 hours and the other 24 hours after the reaction was initiated. A total of 44 pounds of distillate, principally water, was removed from the reaction vessel during the course of the reaction, and was analyzed and found to contain 0.22 pound of maleic anhydride and 1.31 pounds of neopentyl glycol. The polyester according to the invention had an acid number, in an alcohol-benzene solution, of about 14, a Gardner color of 3+, a specific gravity of 1.222, and a softening point of 112° C. A solution of 40 parts by weight thereof in 60 parts by weight of Cellosolve acetate had a refractive index of 1.4515, a Brookfield viscosity at 25° C. of 402 centipoises, and a Gardner viscosity at 25° C. equal to P minus (3.90 stokes).

After completion of the reaction to produce the polyester according to the invention as described in the preceding paragraph, the resin was withdrawn from the reactor and poured into shallow pans for cooling. The cooled and solidified polyester was then granulated and dusted onto the upper surface of a previously formed glass fiber mat which was about 75 mils in thickness and weighed about 1.5 ounces per square foot. The weight of the polyester applied to the mat amounted to about 5 percent of the mat weight. The polyester penetrated the mat, essentially sifting through the interstices among the glass strands, and was heated with the mat in an oven in which air at a temperature of about 325° F. was circulated. Residence time in the oven was about 1.5 minutes. The mat was subsequently cooled to room temperature. This heating and cooling process caused softening and resolidification of the polyester with the result that the strands were bonded to one another. The resulting bonded glass fiber mat was found to be readily handleable and was used successfully for the production of translucent, reinforced, unsaturated polyester panels by standard laminating techniques. Accelerated aging and weathering tests indicate eminently satisfactory properties for the reinforced plastic panels, and less discoloration than has beeen encountered with previously known glass fiber mat binders.

In general, glass fiber mats bonded with polyesters according to the invention vary from about ½ ounce per square foot to about 5 ounces per square foot. The binder content can vary from about 1 percent by weight

---

[3] The term "molecular weight" as used herein and in the appended claims refers to number average molecular weight.
[4] The term "softening point" as used herein and in the appended claims refers to ring-and-ball softening point as determined by ASTM designation E28–58T.

to about 20 percent by weight of the finished mat. Such mats can be produced as described above in ovens operated at air temperatures ranging from about 250° F. to about 450° F.; the preferred air temperature depends upon such factors as residence time in the oven, mat thickness, air velocity and percent binder.

EXAMPLE 2

The reaction procedure and cycle described in Example 1 have also been used to produce various polyesters according to the invention from different formulations. Representative ones of such formulations are presented in Table I, below:

Charge D:
  1,3-propanediol _____ 3
  Isophthalic acid _____ 2
  Maleic anhydride _____ 1

Charge E:
  1,3-propanediol _____ 4
  Isophthalic acid _____ 3
  Maleic anhydride _____ 1

Charge F:
  Ethylene glycol _____ 3
  Isophthalic acid _____ 2
  Maleic anhydride _____ 1

TABLE I

| Polyester No. | Charge in Moles | | | | | | | Polyester Properties | |
|---|---|---|---|---|---|---|---|---|---|
| | Neopentyl-glycol | Diethylene glycol | Isophthalic acid | Adipic acid | Bis(diethylene glycol) terephthalate | Maleic Anhydride | Fumaric Acid | Acid No. | Viscosity [1] |
| 2 | 5.15 | 1 | 4 | | | | 2 | 12 | Q+ |
| 3 | 4.5 | 1.5 | 4 | | | 2 | | 13 | V− |
| 4 | 4 | 1 | 5 | | | | | 6.4 | Q−R |
| 5 | 4 | 1 | | 4.25 | 0.75 | | | 6.9 | Q+ |
| 6 | 5.1 | | | 4.25 | 0.75 | | | 9 | (2) |
| 7 | 6.3 | | | 4.375 | 0.625 | 2.5 | | 15.9 | K− |

[1] Gardner viscosity of 40/60 solution of polyester in Cellosolve acetate.
[2] Viscosity not determined.

Terephthalic acid was substituted for a portion of the isophthalic acid in producing polyester No. 7, above. The esterification of terephthalic acid, however, is more difficult than that of isophthalic acid. It is, therefore, usually preferred, in producing polyesters, where terephthalic acid replaces all of the isophthalic acid first to esterify the other acids or acid composition with the glycol or glycol composition, and then to charge a terephthalic acid diester, e.g., dimethyl terephthalate, rather than the acid, as transesterification then proceeds more readily than direct esterification of the acid to produce the desired terephthalate polyester. Such a transesterification catalyst as litharge can advantageously be used. Alternatively, a glycol diester of terephthalic acid, e.g. bis-(diethylene glycol) terephthalate, can be used in the conventional polyesterification process as in producing Polyester No. 7.

The polyesters according to the invention are unusual in being of intermediate molecular weight: sufficiently high to have the flexibility which, as has been discussed above, is essential in a glass fiber mat binder, but sufficiently low to have at least limited solubility in conventional curable polyester compositions during production of reinforced plastic articles. Polyesters from the following charges have been produced and have been found to be unsatisfactory for use as glass fiber mat binders, for example, because they lack the requisite solubility, flexibility, or the like.

Mols
Charge A:
  1,3-propanediol _____ 4
  Hydrogenated bisphenol A _____ 2
  Maleic anhydride _____ 4
  Phthalic anhydride _____ 2
Charge B:
  1,3-propanediol _____ 4
  Hydrogenated bisphenol A _____ 6
  Maleic anhydride _____ 6
  Phthalic anhydride _____ 4
Charge C:
  1,3-propanediol _____ 2
  Isophthalic anhydride _____ 1
  Maleic anhydride _____ 1

Charge G:
  Diethylene glycol _____ 2
  Hydrogenated bisphenol A _____ 3
  Maleic anhydride _____ 3
  Phthalic anhydride _____ 2
Charge H:
  Neopentyl glycol _____ 1
  Isophthalic acid _____ 1

In addition, charge H lacks the solubility characteristics requisite for satisfactory use in producing a reinforced plastic article.

In the procedure of Example 1, and in the procedure used to produce Polyesters Nos. 2, 3 and 4, the diethylene glycol was a flexibilizer for the polyester. In the procedures used to produce Polyesters Nos. 5 and 6, the flexibilizer was a mixture of diethylene glycol with adipic acid and adipic acid, respectively. It has been found in general that saturated dicarboxylic acids having the generic formula $(CH_2)_n(COOH)_2$, and from 4 to 10 carbon atoms, i.e., members of the homologous series from succinic through sebacic, are effective flexibilizers alone when used to the extent of from about 1 percent to about 25 percent of the total acid portion of the charge. It has further been found that glycols and other polyglycols of the families previously identified, when used to the extent of from about 1 percent to about 25 percent of the glycol charge are similarly effective as flexibilizers. Also, other combinations of such dicarboxylic acids and such glycol or polyglycol flexibilizers can be used, so long as they are employed to the extent of from about 1 percent to about 25 percent of the charge. Optimum results have been achieved when the flexibilizer has been one of the indicated glycols or polyglycols, or a mixture of one with a dicarboxylic acid as described above.

It also has been found that glycols other than neopentyl glycol having the generic formula

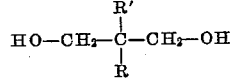

in which R and R' are alkyl groups having from 1 to 4 carbon atoms can be used in place of a part or all of the neopentyl glycol in producing polyesters according to the invention. Examples of glycols having the foregoing formula, other than neopentyl glycol, which have been found to be usable, include: 2-ethyl-2-butyl propanediol-1,3; 2,2-diethyl propanediol-1,3; and 2-methyl-2-ethyl propanediol-1,3.

Similarly, maleic acid and other ethylenically unsaturated alpha, beta-dicarboxylic acid or their anhydrides can be used in place of maleic anhydride or fumaric acid in producing polyesters according to the invention. Preferably, such acids or anhydrides have from 4 to 12 carbon atoms. Examples of such materials which have been found to be usable include itaconic acid and anhydride, citraconic acid and anhydride, mesaconic acid, and chloromaleic acid and anhydride.

As has been indicated above, polyesters according to the invention have a comparatively high molecular weight from about 3000 to about 5000. The final stages of the esterification reaction to produce such polyesters proceed comparatively slowly. It has been found that a limited amount of glycerin can be employed to accelerate the final portion of the esterification. As a specific example of the use of glycerin in this manner, the procedure described in Example 1 hereof was repeated, except that the neopentyl glycol charge was reduced to 128 pounds, until the acid number of the reaction mixture was about 31; thereupon, a 6¼ pound charge of glycerin was added to the reactor, and reaction was continued until the viscosity of a solution of 40 parts by weight of the polyester in 60 parts by weight of Cellosolve acetate had a Gardner viscosity of R.

Polyesters which include glycerin, or equivalent, constitute another preferred family according to the invention. Equivalents for glycerin for this purpose can be described generically as having from 3 to 6 carbon atoms and at least three hydroxyl groups, and as being unsubstituted aliphatic hydrocarbons except for the hydroxyl groups. Pentaerythritol and trimethylol propane are available equivalents for glycerin, but others within the foregoing definition are also operable. When a polyester according to the invention includes glycerin or equivalent, the hydroxyl groups thereof may be considered as replacing some of the glycol hydroxyl groups in the sense that the total number of hydroxyl groups, including those of the glycerin or equivalent, should substantially equal, within the limits set forth above, the total number of carboxyl groups. In general, glycerin or equivalent should be used in such proportion as to provide from about 3 percent to about 20 percent, and, most desirably, from about 4 percent to about 10 percent, of the hydroxyl groups of the polyester. The glycerin or equivalent can replace a part of the neopentyl glycol or equivalent, a part of the flexibilizing glycol or polyglycol, or parts of both.

While the invention has been described in considerable detail, and numerous specific examples of polyesters have been provided, such changes and modifications therefrom as are apparent to one skilled in the art can be made without departing from the spirit and scope of the invention as defined in the appended claims.

What I claim is:

1. A method for producing a bonded glass fiber mat which includes the steps of applying to an unbonded glass fiber mat a polyester of substantially equimolecular proportions of at least one glycol and at least one dicarboxylic acid wherein the glycol consists essentially of from 75 percent to 100 percent of one having the generic formula

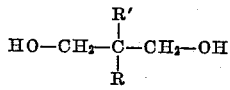

in which R and R' are alkyl groups having from 1 to 4 carbon atoms, and not more than 25 percent of a flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid consists essentially of from 25 percent to 100 percent of at least one selected from the group consisting of isophthalic acid and terephthalic acid, not more than 50 percent of an ethylenically unsaturated alpha,beta-dicarboxylic acid having from 4 to 12 carbon atoms and not more than 25 percent of a flexibilizing acid which is a dicarboxylic acid having from 4 to 10 carbon atoms and the generic formula $$(CH_2)_n(COOH)_2$$

said polyester including at least 1 percent of at least one of the aforesaid flexibilizers, and having a molecular weight of from about 3000 to about 5000, and a softening point of at least 80° C. and in a granulated form, heating at least the polyester to a temperature sufficiently high to cause softening thereof, and cooling the polyester to a temperature sufficiently low that re-solidification thereof occurs.

2. A mat of randomly oriented glass fibers bound together with a binder comprising: a polyester of substantially equimolecular proportions of at least one glycol and at least one dicarboxylic acid wherein the glycol consists essentially of from 75 percent to 100 percent of one having the generic formula

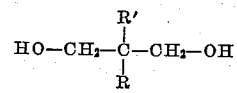

in which R and R' are alkyl groups having from 1 to 4 carbon atoms, and not more than 25 percent of a flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid consists essentially of from 25 percent to 100 percent of at least one selected from the group consisting of isophthalic acid and terephthalic acid, not more than 50 percent of an ethylenically unsaturated alpha,beta-dicarboxylic acid, and not more than 25 percent of a flexibilizing acid which is a dicarboxylic acid having from 4 to 10 carbon atoms and the generic formula $(CH_2)_n(COOH)_2$, said polyester including at least 1 percent of at least one of the aforesaid flexibilizers, and having a molecular weight of from about 3000 to about 5000, and a softening point of at least 80° C.

3. A mat of randomly oriented glass fibers containing a binder bonded to the fibers and bonding the fibers together at their points of contact, said binder comprising a polyester of substantially equimolecular proportions of at least one glycol and a dicarboxylic acid composition wherein the glycol consists essentially of from 75 percent to 100 percent of one having the generic formula

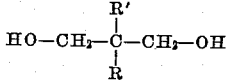

in which R and R' are alkyl groups having from 1 to 4 carbon atoms, and not more than 25 percent of a flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid composition consists essentially of from 25 percent to 90 percent of at least one selected from the group consisting of isophthalic acid and terephthalic acid, from 10 percent to 50 percent of an ethylenically unsaturated alpha,beta-dicarboxylic acid having from 4 to 12 carbon atoms, and not more than 25 percent of a flexibilizing acid which is a dicarboxylic acid having from 4 to 10 carbon atoms and the generic formula $(CH_2)_n(COOH)_2$, said polyester including at least 1 percent of at least one of the aforesaid flexibilizers, and having a molecular weight of from about 3000 to about 5000, and a softening point of at least 80° C.

4. A mat of randomly oriented glass fibers containing a binder bonded to the fibers and bonding the fibers together at their points of contact, said binder comprising a polyester of substantially equimolecular proportions of a glycol composition and at least one dicarboxylic acid wherein the glycol composition consists essentially of from 75 percent to 99 percent of one having the generic formula

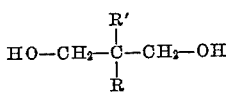

in which R and R' are alkyl groups having from 1 to 4 carbon atoms, and from 1 percent to 25 percent of at least one flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid consists essentially of from 50 percent to 100 percent of one selected from the group consisting of isophthalic acid and terephthalic acid, and not more than 50 percent of an ethylenically unsaturated alpha,beta-dicarboxylic acid having from 4 to 12 carbon atoms, said polyester having a molecular weight of from about 3000 to about 5000, and a softening point of at least 80° C.

5. A mat of randomly oriented glass fibers containing a binder bonded to the fibers and bonding the fibers together at their points of contact, said binder comprising a polyester of substantially equimolecular proportions of a glycol composition and a dicarboxylic acid composition wherein the glycol composition consists essentially of from 75 percent to 99 percent of one having the generic formula

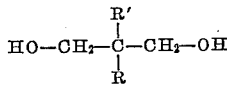

in which R and R' are alkyl groups having from 1 to 4 carbon atoms, and from 1 percent to 25 percent of at least one flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid composition consists essentially of from 50 percent to 90 percent of one selected from the group consisting of isophthalic acid and terephthalic acid, and from 10 percent to 50 percent of an ethylenically unsaturated alpha,beta-dicarboxylic acid having from 4 to 12 carbon atoms, said polyester having a molecular weight of from about 3000 to about 5000, and a softening point of at least 80° C.

6. A mat of randomly oriented glass fibers containing a binder bonded to the fibers and bonding the fibers together at their points of contact, said binder comprising a polyester of substantially equivalent proportions of a polyol composition and a dicarboxylic acid composition wherein the polyol composition consists essentially of a glycol having the generic formula

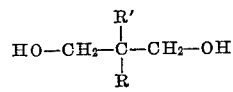

in which R and R' are alkyl groups having from 1 to 4 carbon atoms, at least one flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and at least one aliphatic polyol having from 3 to 6 carbon atoms and at least three hydroxyl groups selected from the group consisting of glycerin, trimethylol propane and pentaerythritol, and wherein from 75 percent to 96 percent of the hydroxyl groups of the polyol composition are from the glycol having the formula

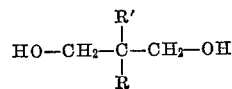

from 1 percent to 25 percent of such hydroxyl groups are from the flexibilizing glycol, and from 3 percent to 20 percent of such hydroxyl groups are from the aliphatic polyol, the acid composition consists essentially of from 50 percent to 90 percent of one selected from the group consisting of isophthalic acid and terephthalic acid, and from 10 percent to 50 percent of an ethylenically unsaturated alpha,beta-dicarboxylic acid having from 4 to 12 carbon atoms, said polyester having a molecular weight of from about 3000 to about 5000, and a softening point of at least 80° C.

7. A mat of randomly oriented glass fibers containing a binder bonded to the fibers and bonding the fibers together at their points of contact, said binder comprising a polyester of substantially equivalent proportions of a glycol composition and a dicarboxylic acid composition wherein the glycol composition consists essentially of from 75 percent to 99 percent of a glycol having the generic formula

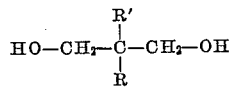

in which R and R' are alkyl groups having from 1 to 4 carbon atoms, and from 1 percent to 25 percent of at least one flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid composition consists essentially of from 50 percent to 90 percent of one selected from the group consisting of isophthalic acid and terephthalic acid, and from 10 percent to 50 percent of an ethylenically unsaturated alpha, beta-dicarboxylic acid having from 4 to 12 carbon atoms, said polyester having a molecular weight of from about 3000 to about 5000, and a softening point of at least 80° C.

8. A mat of randomly oriented glass fibers containing a binder bonded to the fibers and bonding the fibers together at their points of contact, said binder comprising a polyester of substantially equivalent proportions of a polyol composition and a dicarboxylic acid composition wherein the polyol composition consists essentially of neopentyl glycol, diethylene glycol, and glycerin, and wherein from 75 percent to 96 percent of the hydroxyl groups of the polyol composition are from the neopentyl glycol, from 1 percent to 25 percent of such hydroxyl groups are from the diethylene glycol, and from 3 percent to 20 percent of such hydroxyl groups are from the glycerin, the acid composition consists essentially of from 50 percent to 90 percent of at least one selected from the group consisting of isophthalic acid and terephthalic acid, and from 10 percent to 50 percent of maleic acid, said polyester having a molecular weight of from about 3000 to about 5000, and a softening point of at least 80° C.

9. A mat of randomly oriented glass fibers containing a binder bonded to the fibers and bonding the fibers together at their points of contact, said binder comprising a polyester of substantially equivalent proportions of a glycol composition and a dicarboxylic acid composition wherein the glycol composition consists essentially of from 75 percent to 99 percent of neopentyl glycol, and from 1 percent to 25 percent of diethylene glycol, and the acid composition consists essentially of from 50 percent to 90 percent of at least one selected from the group consisting of isophthalic acid and terephthalic acid, and from 10 percent to 50 percent of maleic acid, said polyester having a molecular weight of from about 3000 to about 5000, and a softening point of at least 80° C.

10. A mat of randomly oriented glass fibers containing a binder bonded to the fibers and bonding the fibers together at their points of contact, said binder comprising a polyester of substantially equimolecular proportions of a glycol composition and a dicarboxylic acid composition wherein the glycol composition consists essentially of from 75 percent to 85 percent of neopentyl glycol and from 15 percent to 25 percent of diethylene glycol, and the acid composition consists essentially of from 60 percent to 75 percent of at least one selected from the group consisting of isophthalic acid and terephthalic acid, and from 25 percent to 40 percent of maleic acid, said polyester having a molecular weight of from about 3000 to about 5000, and a melting point of at least 80° C.

11. A mat of randomly oriented glass fibers containing a binder bonded to the fibers and bonding the fibers together at their points of contact, said binder comprising a polyester of substantially equivalent proportions of a glycol composition and a dicarboxylic acid composition wherein the glycol composition consists essentially of from 75 percent to 99 percent of neopentyl glycol, and from 1 percent to 25 percent of diethylene glycol, and the acid composition consists essentially of from 50 percent to 90 percent of isophthalic acid, and from 10 percent to 50 percent of maleic acid, said polyester having a molecular weight of from about 3000 to about 5000, and a softening point of at least 80° C.

12. A mat of randomly oriented glass fibers containing a binder bonded to the fibers and bonding the fibers together at their points of contact, said binder comprising a polyester of substantially equimolecular proportions of at least one glycol and at least one dicarboxylic acid wherein the glycol consists essentially of from 75 percent to 85 percent of one having the generic formula

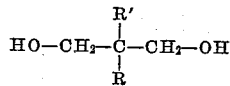

in which R and R' are alkyl groups having from 1 to 4 carbon atoms, and not more than 25 percent of a flexibilizing glycol selected from the group consisting of glycols having from 3 to 8 carbon atoms wherein there are a total of at least three hydrogens attached to the two carbon atoms to which the hydroxy groups are attached and there is a methylene group in a hydrocarbon chain linking these two carbons, and polyglycols having from 4 to 18 carbon atoms, and the acid consists essentially of from 25 percent to 100 percent of one selected from the group consisting of isophthalic acid and terephthalic acid, not more than 50 percent of an ethylenically unsaturated alpha,beta-dicarboxylic acid having from 4 to 12 carbon atoms, and not more than 25 percent of a flexibilizing acid which is a dicarboxylic acid having from 4 to 10 carbon atoms and the generic formula

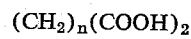

said polyester including at least 15 percent of at least one of the aforesaid flexibilizers, and having a molecular weight of from about 3000 to about 5000, and a softening point of at least 80° C.

13. A mat of randomly oriented glass fibers containing a binder bonded to the fibers and bonding the fibers together at their points of contact, said binder comprising a polyester of substantially equimolecular proportions of a polyol composition and a dicarboxylic acid composition wherein the polyol composition consists essentially of neopentyl glycol, diethylene glycol, and glycerin, and wherein from 75 percent to 85 percent of the hydroxyl groups of the polyol composition are from the neopentyl glycol, from 15 percent to 25 percent of such hydroxyl groups are from the diethylene glycol, and from 4 percent to 10 percent of such hydroxyl groups are from the glycerin, and the acid composition consists essentially of from about 60 percent to about 75 percent of isophthalic acid, and from about 25 percent to about 40 percent of maleic acid, said polyester having a molecular weight of from about 3000 to about 5000, and a softening point of at least 80° C.

14. A mat of randomly oriented glass fibers containing a binder bonded to the fibers and bonding the fibers together at their points of contact, said binder comprising a polyester of substantially equimolecular proportions of a glycol composition and a dicarboxylic acid composition wherein the glycol composition consists essentially of from 75 percent to 85 percent of neopentyl glycol and from 15 percent to 25 percent of diethylene glycol, and the acid composition consists essentially of from about 60 percent to about 75 percent of isophthalic acid, and from about 25 percent to about 40 percent of maleic acid, said polyester having a molecular weight of from about 3000 to about 5000, and a softening point of at least 80° C.

References Cited

UNITED STATES PATENTS 2,828,278    3/1958    Kosmin            260—75
3,153,005   10/1964    Minter             260—75

FOREIGN PATENTS 588,833    8/1944    Great Britain.

WILLIAM H. SHORT, *Primary Examiner.*
R. T. LYON, *Assistant Examiner.*